W. N. MOORE, Dec'd.

W. A. STRONG, JR., Administrator, Assignor to SOLAR STOVE WORKS.

Cooking-Stove.

No. 8,111. Reissued March 5, 1878.

WITNESSES:

W. W. Hollingsworth

Edw. W. Byrn

Wm. A. Strong Jr.
Administrator of the Estate of
Wm. N. Moore deceased.

BY

ATTORNEYS.

N. PETERS, Photo-Lithographer, Washington, D. C.

UNITED STATES PATENT OFFICE.

WILLIAM A. STRONG, JR., OF JOLIET, ILLINOIS, (ADMINISTRATOR OF WILLIAM N. MOORE, DECEASED,) ASSIGNOR TO SOLAR STOVE WORKS, OF SAME PLACE.

IMPROVEMENT IN COOKING-STOVES.

Specification forming part of Letters Patent No. 96,826, dated November 16, 1869; Reissue No. 8,111, dated March 5, 1878; application filed January 18, 1878.

*To all whom it may concern:*

Be it known that WM. N. MOORE, of the village of Neenah, in the county of Winnebago and State of Wisconsin, did invent a new and useful Improvement in Extension-Top Cooking-Stoves; and that the following is a full, clear, and exact description thereof, reference being had to the accompanying drawings, forming a part of this specification.

The invention relates to an improvement in reservoir cook-stoves, or that class of stoves in which the stove is extended to the rear of the smoke-pipe to form hot air-flues to heat a water-reservoir or other kitchen-vessel which may be placed thereon.

The improvement consists, chiefly, in combining a double damper with a cook-stove having this extended chamber in the rear and down-draft or diving flues between the same and the body of the stove, the said double damper being constructed with a single axis and two wings, which simultaneously control the communication with said down-draft flues, as hereinafter more fully described.

Figure 1:
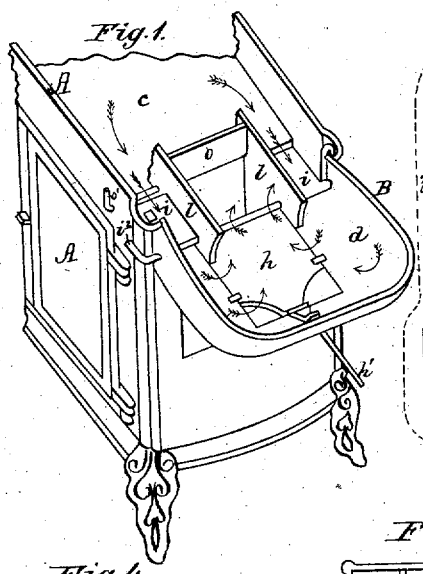
Figure 2:
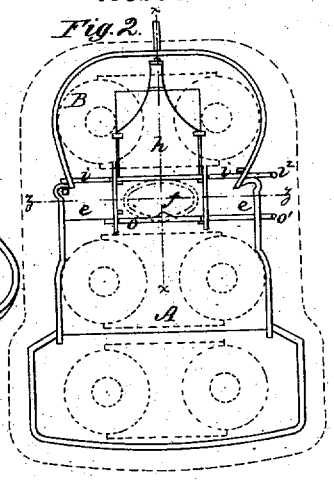
Figure 3:
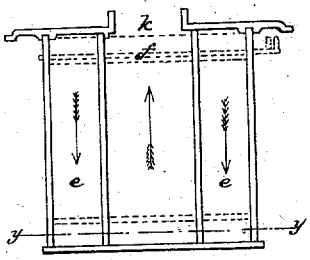
Figure 4:
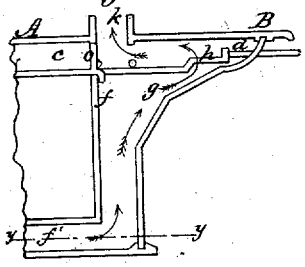
Figure 5:
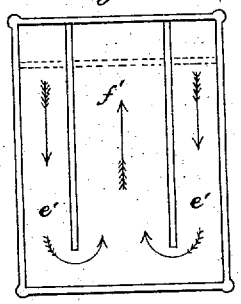
Figure 6:
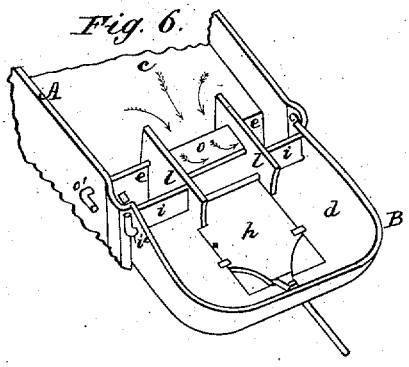
Figure 7:
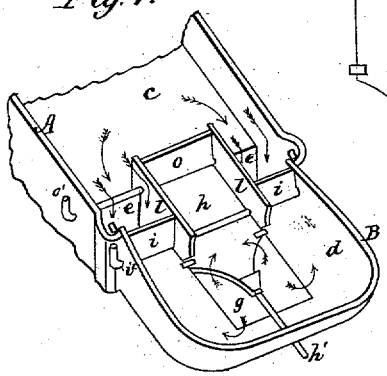
Figure 8:
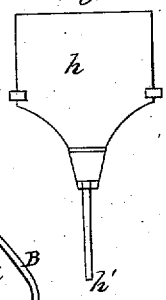
Figure 9:
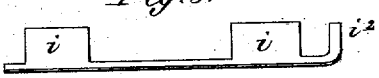
Figure 10:
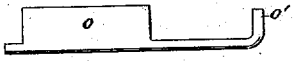

Figure 1 is a perspective view of a fragment of a stove provided with the extension and having the top plate removed. Fig. 2 is a plan view, having the top cover removed and its position indicated by dotted lines. Fig. 3 is a vertical transverse section taken through the line *z z* of Fig. 2, showing the ordinary vertical down-draft flues. Fig. 4 is a fragmentary vertical longitudinal section through line *x x* of Fig. 2. Fig. 5 is a horizontal section through lines *y y* in Figs. 3 and 4, showing the ordinary arrangement of flues beneath the oven. Figs. 6 and 7 are views similar to Fig. 1, but showing different positions of the dampers for producing the different circulations of the hot currents. Fig. 8 is a detail view of a horizontal sliding damper. (Seen at *h* in Figs. 1, 4, 6, and 7.) Fig. 9 is a detail view of a two-part rolling damper. (Seen at *i* in Figs. 1, 6, and 7.) Fig. 10 is a detail view of the ordinary damper used for cutting off the direct escape of the heat and smoke and diverting the same beneath the oven, the same being seen at *o* in Figs. 1, 6, and 7.

A is an ordinary stove, with an extension-top attached, and seen at B. *c* is the ordinary main flue and hot-air chamber above the oven. *d* is the extension-flue and hot-air chamber in the rear of the stove proper. *e e*, Figs. 3, 6, and 7, are vertical descending flues, arranged upon opposite sides of the stove, and communicating at their lower ends with horizontal flues *e′ e′*, Fig. 5, beneath the oven. *f′* is a central horizontal return-flue beneath the oven, communicating at its front end with the flues *e′ e′*, and taking the currents therefrom back to the vertical ascending flue *f* and *g*, Fig. 4. *h* is a slide-damper, adjusted by the handle *h′*, and arranged to alternately open communication between the flues *f* and *g* and the exit-pipe—that is to say, when pushed in, it shuts off communication between the flue *f* and the exit-pipe, and opens communication between the flue *g* and the exit-pipe through the chamber *d*. When pulled out the reverse effect is produced.

*i i* is a two-part rolling damper, consisting of an axial shaft with two wings cast thereon. This double damper is arranged in bearings in the stove, with the wings controlling the currents through the flues *e e* and chamber *d*, and located between the outer walls of the stove and the two permanent flue-strips *l l*.

*o* is the single-plate rolling damper, adjusted by the handle *o′*. *k* is the ordinary escape-flue or smoke-pipe.

The arrows seen in the several views show the currents of hot air and smoke.

To use the stove in the ordinary manner without allowing the hot air to enter the extension or pass beneath the oven, the damper *o* is adjusted horizontally, the damper *i i* adjusted vertically, and the damper *h* drawn out, all as seen in Fig. 6, thus allowing the hot air and smoke to escape in the ordinary manner directly from the main flue *c* to the escape or smoke flue *k*.

To heat the bottom of the oven without heating the extension, the same adjustment shown in Fig. 6 is preserved, except that the damper *o* is adjusted vertically. This, instead of allowing the heat to escape direct from *c*, causes the currents to pass down *e e*, traverse *e′ e′* to the front beneath the oven, and back again beneath the oven through the return-flue $f'$, and thence up $f$ and out $k$. This permits the main part of the stove to be heated and the heat thrown above or below the oven, as desired, without heating the extension.

To heat the main portion of the stove above the oven, and also the extension, but not the bottom of the oven, the dampers are adjusted as in Fig. 1, in which $o$ is arranged vertically, cutting off the direct passage from $c$ to $k$, and $i\ i$ is arranged horizontally, closing the tops of the flues, and opening communication between the space $c$ above the oven and the chamber $d$ of the extension, through which the hot currents circulate, and whence they escape to the smoke-pipe between the permanent flue-strips $l\ l$. To heat the oven both above and below, and also the extension, the dampers are arranged as in Fig. 7, in which the damper $o$ is arranged vertically, the dampers $i\ i$ arranged vertically, and the sliding damper $h$ pushed in. The hot currents then from $c$ pass down the side flues $e\ e$, traverse the flues $e'\ e'$ beneath the oven, and return through $f'$, whence they arise and pass into $d$, and thence to the smoke-pipe.

This arrangement of dampers, it will be seen, permits the following adjustments and diversion of the hot currents: first, to heat the top of the oven simply without heating the extension; second, to heat the top and bottom of the oven without heating the extension; third, to heat the top of the oven and the extension; and, fourth, to heat the top and bottom of the oven, and also the extension.

In defining more clearly the scope of this patent, I would state that no broad claim is now made to the arrangement of the extension-chamber, the rear descending flues of the stove, and dampers controlling the same, as whatever of patentability there might be therein has, in an interference in the Patent Office between the said Moore, deceased patentee, and another party, been decided in favor of the other party, and only claims are now made to such features of improvement as did not appear in the invention of the other party, and were not in controversy, to wit: the combination of the double damper with the descending flues and extension-chamber, and also the combination of the damper $h$ with the dampers $o$ and $i\ i$ and the stove having flues, as described.

It will be seen that the location of the double dampers at the point shown enables them to do double duty in controlling communication between chambers $c$ and $d$ and in controlling communication also between chamber $c$ and flues $e\ e$. The sliding damper $h$ also serves (in connection with the other dampers) to secure the heating of the extension by the currents passed beneath the oven as well as those above the oven.

What I claim as the invention of the said Wm. N. Moore, deceased, is—

1. The double damper having a single axis and two wings, in combination with a cooking-stove having down-draft side flues and an extension-chamber in the rear, substantially as described.

2. The dampers $i$, combined with a stove having side flues $e\ e$ and an extension-chamber, B, and arranged, as shown, so as to do double duty, as described.

3. The horizontal sliding damper $h$, combined with the extension B and with the stove having down-draft side flues $e\ e$ and dampers $o$ and $i$, substantially as and for the purpose described.

WILLIAM A. STRONG, Jr.,
*Administrator of the estate of Wm. N. Moore, deceased.*

Witnesses:
Irving D. Stevens,
Frances S. Moore.